E. H. SNYDER.
CAN.
APPLICATION FILED MAR. 6, 1916.

1,316,600.

Patented Sept. 23, 1919.

WITNESSES:

Harold Metcalf
Isaac H Joseph

Emmanuel Henry Snyder
INVENTOR.

Andrew L. Chezom
ATTORNEY.

UNITED STATES PATENT OFFICE.

EMMANUELL HENRY SNYDER, OF DAVENPORT, IOWA.

CAN.

1,316,600.   Specification of Letters Patent.   Patented Sept. 23, 1919.

Application filed March 6, 1916. Serial No. 82,399.

*To all whom it may concern:*

Be it known that I, EMMANUELL HENRY SNYDER, a citizen of the United States, residing at Davenport, in the county of Scott, in the State of Iowa, have invented a new and useful Can, of which the following is a specification.

My invention relates to improvements in seed planting machines in which revolving seed plates are used; and the objects of my improvement are, First, to provide a can with compartments suited to keeping different grains which are sought to be planted in the same row or hill, separate from each other, the better to regulate the number of each to be deposited in the row or hill.

Second, to provide means whereby the different seeds which are to be planted may be put into the can and removed therefrom without mixing or spilling.

Third, to provide means whereby different seeds may be planted by the machine in the same row without planting them in the same hill.

Fourth, to provide a can which is readily changeable from or to a can of one or more compartments.

Fifth, to provide a can having compartments with suitable devices to hold each compartment in place when filled and empty, adapting the cans to the seed plates.

I attain these objects by the mechanism illustrated in the accompanying drawings, in which—

Similar letters refer to similar parts throughout the several views.

The drawings themselves furnish the better illustration of my invention.

The can consists of the sides of the main can, the inner can compartments, the lid, the apertures and coverings of apertures into each compartment, the means for securing the lid and the means for securing the inner can compartment in place.

Figure 1:
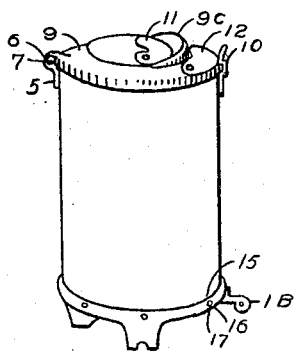
Figure 1 is a perspective view of the can mounted on the seed plate base, with the lid closed, as commonly adaptable to a corn planter.
Figure 2:
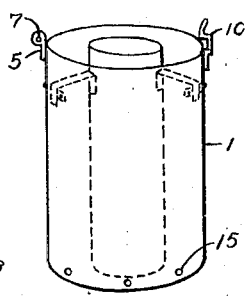
Fig. 2 is a perspective view of the can detached and uncovered, the lid dismounted therefrom, disclosing and illustrating the position of the inner can compartment thereof.
Figure 3:
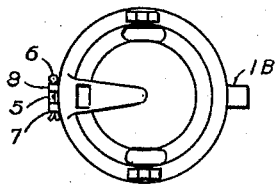
Fig. 3 is a perspective view of the can detached and uncovered, the lid dismounted therefrom, the inner can compartment thereof removed therefrom.
Figure 4:
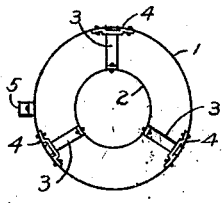
Fig. 4 is the perspective view of the inner can compartment, disclosing the arm or lateral brace means by which the same is attached to the main can shown in Fig. 1.
Figure 5:
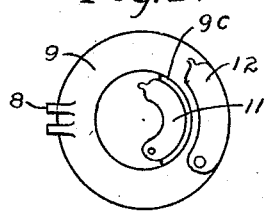
Fig. 5, is a bottom view of the can when the same is attached to the seed plate base.

The bottom of the outer can 1 is secured by means of bolts and nuts to the outer rim of the seed plate base the bolts passing through both and secured by nuts as shown at 15 and 16 Fig. 1. The lid is hinged to the top of can 1 at a point opposite the hinge side of the seed plate base, the hinge side being designated as $1^b$, the lid having hinge jaws with hole for pin 8, and when adjusted on the can the lid is held in place in part and prevented from opening by a fastener spring 10, riveted to the base hinge side of 1, which permits of being sprung away from the can at its top or free end, and allows the lid to be raised, on lid hinge 5, 6 and 7.

Figure 6:
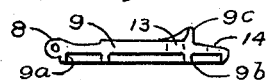
Fig. 6 is a side elevation of the cover.
Figure 7:
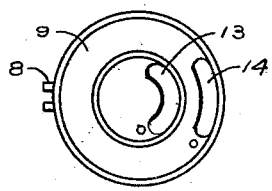
Fig. 7 is another plan view of the can.

Inside of can 1 may be placed inner can compartment 2, which also is a round can, approximately same length, but smaller diameter than 1, and which rests at bottom on seed plate base, and is held in place by three lateral arm braces riveted to its outer sides at even distances apart, with ends turned down as shown at 3, which are hooked in strap slots Figs. 12 and 13, attached at three sides of inside of can 1, as shown at 4, and is also held in place by the flange of the lid as shown at $9^b$ of Fig. 6, which extends downward into the inner can compartment the requisite distance and fitting snugly to hold the same in place when the lid is closed down, thus making a can of two compartments, with seed plate base for bottom and the lid for the top.

At the outside edge and underside of lid as shown is another flange $9^a$, extending downward and inside the outer can 1 at its top a requisite distance and fitting snugly to hold the top in place when fastened down by means of spring latch 10.

The lid is so arranged that inside of the inner flange $9^b$, and on the side opposite the hinge holes 8, in a semicircular aperture 13 with its outer edge flush with the flange on the inside, and being of the same radius as the inner can compartment, and adjacent one end thereof having also a small bolt hole for securing the covering plate by pin means, and also having at its outer edge and inside of the outer compartment, and of the same radius and flush with the outer flange 9ª, another aperture 14, and adjacent one end thereof having also a small bolt hole for securing the covering plate by pin means as shown and so arranged that over each aperture and covering the same and of similar shape is a small cover secured at one end by pin means and latching at the other end.

On the top of the lid 9 and 9ᶜ is a spout protruding upward, of the circle of the inner can compartment, the outside of the semicircle of the spout being toward the hasp side of the lid, thus forming a spout for the inner can compartment, and formed as part of lid 9.

I claim:

1. In a device of the character described, two cylindrical members, one of said members being placed concentrically within the other and spaced from the inner walls thereof, a cover hingedly related to the outer one of said members, said cover having a substantially semi-circular aperture therethrough, an up-turned flange carried by said cover and adjacent the outer edge of said aperture.

2. In a device of the character described, which comprises two cylindrical members, one placed concentrically within the other and spaced from the inner walls thereof, a hinged cover carried by the outer of said members, said cover having substantially semi-circular apertures therethrough, pivotedly mounted closures for said apertures carried by said cover and an up-turned flange carried by said cover and intermediate said apertures.

EMMANUELL HENRY SNYDER.

Witnesses:
HAROLD METCALF,
ISAAC H. JOSEPH.

Copies of this patent may be obtained for five cents each, by addressing the "Commissioner of Patents, Washington, D. C."